Jan. 5, 1932. F. S. HUDSON 1,839,680
CONNECTING ROD
Original Filed June 24, 1929
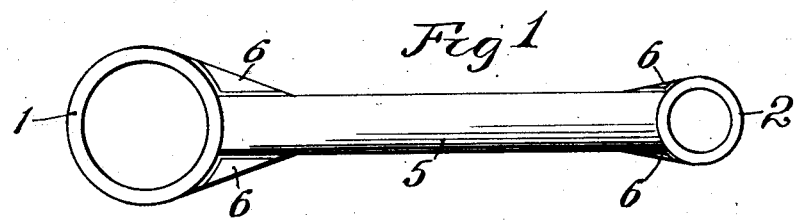
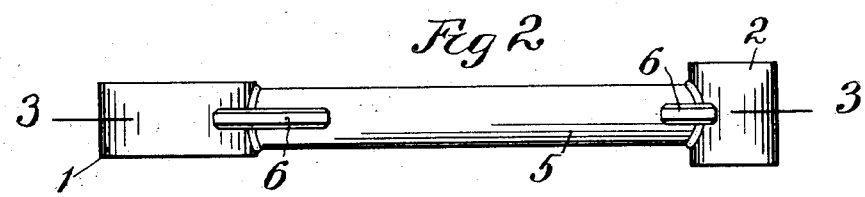
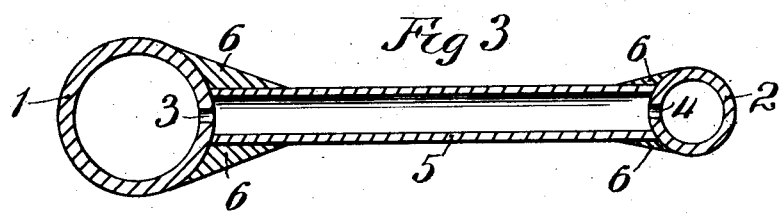
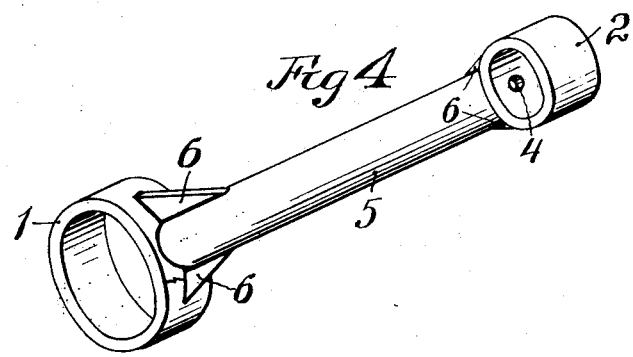
Witness
H. Vernon Olson
INVENTOR.
Finn S. Hudson.
BY Warren D. House.
His ATTORNEY Patented Jan. 5, 1932

1,839,680

UNITED STATES PATENT OFFICE

FINN S. HUDSON, OF KANSAS CITY, MISSOURI, ASSIGNOR TO IRENE HUDSON, OF KANSAS CITY, MISSOURI

CONNECTING ROD

Application filed June 24, 1929, Serial No. 373,171. Renewed November 14, 1931.

My invention relates to improvements in connecting rods for engines. It is particularly well adapted for use in connection with the motors of air craft.

One of the objects of my invention is to provide a novel connecting rod of the kind described, which is simple and cheaply constructed, and is strong yet light, which is tubular and adapted for the conveyance of oil from one of the members with which it is connected to the other member to which it is connected, which consists of an integral body and has no seams or open joints in contact with the members with which it is associated, and which is balanced throughout.

The novel features of my invention are hereinafter fully described and claimed.

In the accompanying drawings, which illustrates the preferred embodiment of my invention, Fig. 1 is a side elevation of my improved connecting rod.

Fig. 2 is a top view thereof.

Fig. 3 is a section on the line 3—3 of Fig. 2.

Fig. 4 is a perspective view of the rod.

Similar reference characters designate similar parts in the different views.

My improved connecting rod comprises an integral body having two parallel seamless tubular end portions comprising, preferably two parallel seamless steel tubes 1 and 2, adjacent side walls of which are provided respectively with two transverse holes forming oil passages 3 and 4. Said body has an intermediate tubular portion 5, preferably a seamless steel tube the ends of which are integral with said side walls by being welded thereto, and the ends of which respectively communicate with the passages 3 and 4.

As is well known, seamless steel tubes, as usually made, are drawn tubes having straight walls of even thickness and circular in cross ection. Such tubes, for their weight, have a maximum of tensile strength, are not liable to crack or to fracture due to any internal stress. The tubes 1, 2 and 5, shown in the drawing, are circular in cross section, have straight walls of even thickness and are seamless steel tubes. A connecting rod made as described will be relatively light, strong, well balanced and not liable to crack or fracture in use.

The body is provided with integral gusset portions comprising, preferably, angular gusset steel plates 6 arranged in two pairs, the gusset plates of one pair being integral, as by welding, with opposite sides of one end portion of the tube 5 and with the adjacent side wall of the tube 1. In like manner the gusset plates of the other pair are integral, preferably by welding, with opposite sides of the other end portion of the tube 5 and with the side wall of the tube 2 next adjacent thereto.

This construction eliminates the usual separate cap for embracing the crank of the crank shaft, with which the seamless tube 1 is adapted for engagement, and there are no seams or open joints contacting with the crank. The construction also provides a strong, well balanced and light connecting rod which is well adapted for use on air craft or other engines. Being hollow throughout, oil is conducted through the tube 5 from the tube 1 to the tube 2 for lubricating the latter and the piston pin with which it is connected.

I do not limit my invention to the structure shown and described, as modifications, within the scope of the appended claims, may be made without departing from the spirit of my invention.

What I claim is:—

1. A connecting rod for an engine comprising two parallel seamless steel tubes, and a seamless steel tube welded at its ends to the adjacent sides of said tubes, each of said tubes having straight walls of even thickness throughout and being circular in cross section.

2. A connecting rod for an engine consisting in two parallel seamless steel tubes, and a seamless steel tube integral at its ends with the adjacent sides of said two tubes, each of said tubes having straight walls of even thickness throughout.

In testimony whereof I have signed my name to this specification.

FINN S. HUDSON.